May 28, 1929.  G. W. CARLSON  1,715,340
AUTOMOTIVE BRAKE
Filed Jan. 29, 1924
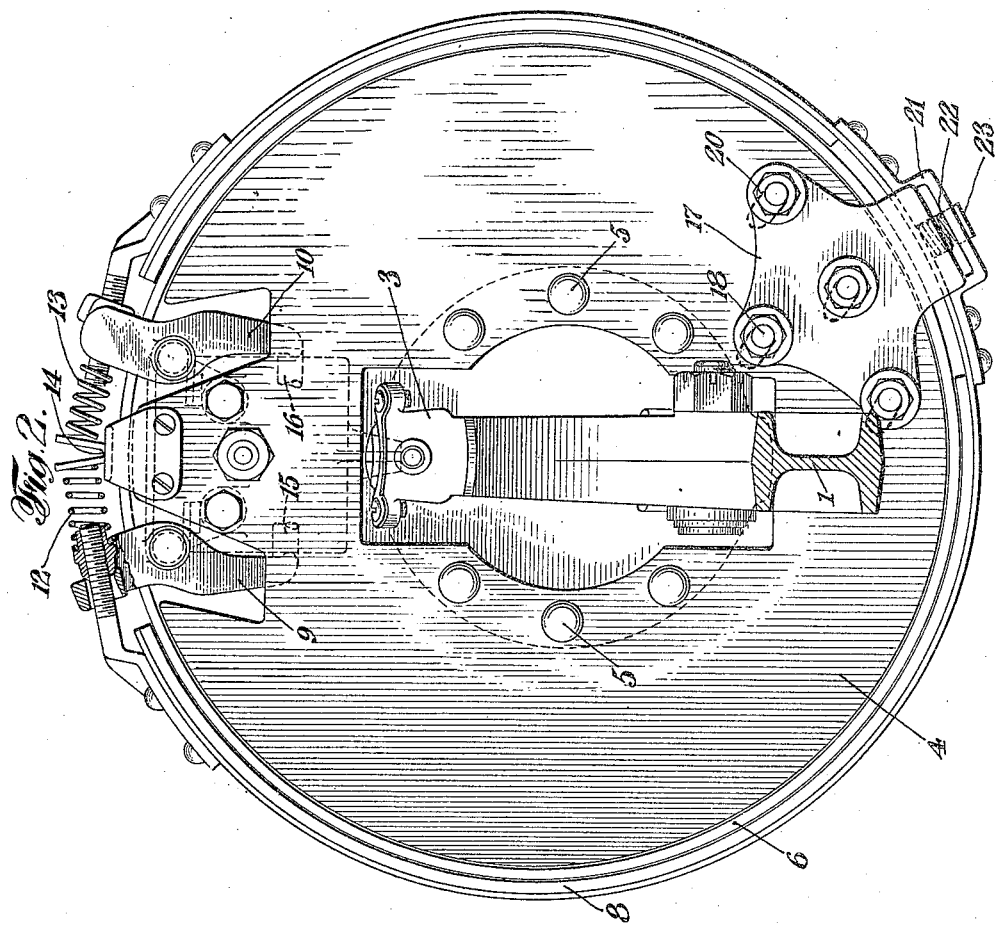
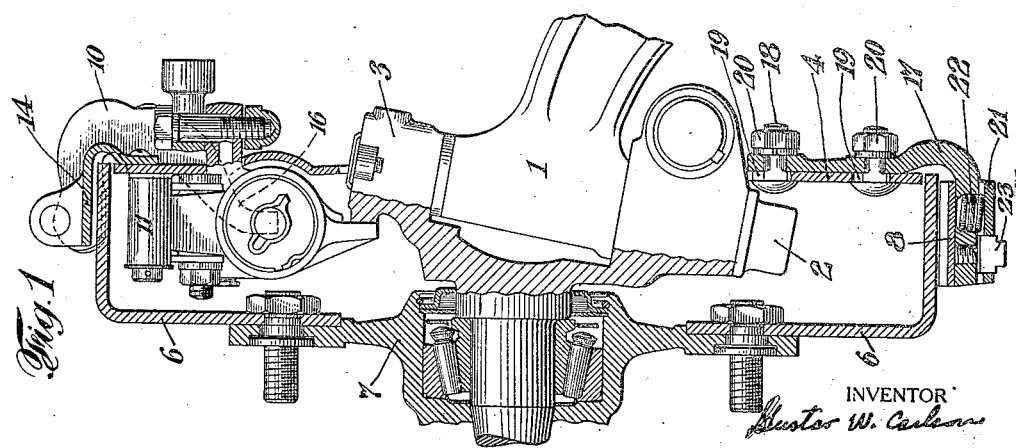

Patented May 28, 1929.

1,715,340

UNITED STATES PATENT OFFICE.

GUSTAV W. CARLSON, OF CLEVELAND, OHIO, ASSIGNOR TO THE EATON AXLE & SPRING COMPANY, OF CLEVELAND, OHIO, A CORPORATION OF OHIO.

AUTOMOTIVE BRAKE.

Application filed January 29, 1924. Serial No. 689,206.

My invention relates to automotive brakes, and more particularly to brake anchor brackets for adjustably supporting the brake shoes.

Supporting the brake shoes of automotive vehicles so that they will have freedom of movement without dragging, and at the same time be readily adjustable, has always been a problem of importance in connection with automotive brake systems.

An object of this invention is to provide a compact, rigid, and efficient structure which will not only provide the necessary adjustment but will also normally hold the brake shoe away from the brake drum and in proper lateral alignment therewith.

According to the preferred embodiment of my invention I provide a brake shoe supporting bracket which is attached to the dust shield in such a manner that it is free to be adjusted radially but securely held against any twisting movement.

My invention consists in the novel construction, arrangement and combination of parts hereinafter described according to the preferred embodiment thereof. The invention will be more particularly pointed out in the appended claims.

Referring to the drawings illustrating by way of example the preferred embodiment of the invention, Fig. 1 is a front elevation, partly in section, showing, by way of illustration, portions of the front axle, brake drum and associated brake elements.

Fig. 2 is a side elevation of Fig. 1.

The front axle of the automotive vehicle is designated as 1, carrying a pivot 2 about which is swiveled a steering knuckle 3. Attached to knuckle 3 is a non-rotatable member which in the present embodiment takes the form of a dust shield 4 secured by bolts 5 (Fig. 2). A brake drum 6 is attached to a hub 7 which is rotatably mounted on knuckle 3 and lies contiguous to the non-rotatable member 4. A brake shoe 8, composed of a brake band and brake lining, is partially supported by operating cranks 9 and 10 carried by a hanger 11. Springs 12 and 13 respectively are each interposed between a stop member 14, attached to the dust shield 4, and each end of the brake shoe to normally hold the brake shoe inoperative. Operating members 15 and 16 engage cranks 9 and 10 respectively to separate their lower ends and thereby pull the brake shoe ends together to force the shoe into engagement with the drum. These members 15 and 16 may be operated by any suitable movement such as hydraulic pistons or in any other suitable manner.

An L shaped anchor bracket member 17 has one leg attached to the dust shield member 4 by means of spaced projections, in this instance, bolts 18 which are adapted to move with one member and adjustably engage the other member, the bolts 18 being provided with square portions under their heads for engagement in slots 19 extending approximately radially in the shield 4; the round ends of the bolts extending through cooperating holes in bracket 17. Nuts 20 are provided for locking the bracket in the desired position. The other leg of the bracket extends over the brake shoe. A member 21 with an offset central portion is attached to the brake shoe with the offset portion straddling the bracket. A spring 22 is seated in a bore in the bracket with its lower end bearing against the member 21 to yieldably hold the shoe away from the drum. A stud 23 is screwed into the bracket 17 with its head passing freely through a hole in the offset portion of member 21 to hold the shoe in lateral alignment with the drum.

Adjustment radially.

To adjust the shoe 8 radially with respect to the drum, the nuts 20 are loosened, the bracket together with the bolts 18 is moved radially—the square portion on the bolts sliding in slots 19—and the nuts are then tightened to hold the bracket in such a position that the spring 22 will normally hold the shoe away from the drum and the stud 23 will keep the shoe in proper lateral alignment. When the nuts 20 are being tightened the bolts 18 are held from turning by the engagement of the slots 19 by the flat portions under the bolt heads.

When the members 15 and 16 are operated outwardly the cranks 9 and 10 are moved to draw the brake shoe ends together against the action of springs 12 and 13 and as the shoe contracts around the drum the spring 23 is compressed allowing the shoe at this point to also engage the drum, the stud sliding freely through the hole in member 21.

This invention is shown and described, by way of illustration, as being embodied in a front wheel brake of the external contracting type; but it is to be understood that the invention is not to be so limited, as it is equally as well adapted to different types of brakes.

While I have described my invention according to the preferred embodiment of the same it will be obvious to those skilled in the art, after understanding my invention, that various alterations, modifications and substitutions may be made without departing from the scope of the invention, and I aim in the appended claims to cover all such modifications.

Having thus described my invention, what I claim as new and desire to secure by Letters Patent, is:

1. In an automotive vehicle the combination of a brake drum, a brake shoe, a non-rotatable member associated with said drum, a brake anchor bracket secured to said non-rotatable member and adjustable radially thereof, said bracket extending over said shoe in spaced relation to said drum, a member secured to said brake shoe on each side of and passing over said anchor bracket so as to bridge over the same, resilient means between said member secured to said brake shoe and said bracket, and means passing through said bridging member and into said anchor bracket and whose longitudinal axis is spaced from the axis of said resilient means for positively holding said bracket laterally and against rotation.

2. In an automotive vehicle the combination of a brake drum, a brake shoe, a non-rotatable member associated with said drum, a brake anchor bracket secured to said non-rotatable member and adjustable radially thereof, a member secured to said brake shoe and passing over said anchor bracket, a stud screwed into said anchor bracket with its head projecting outwardly beyond said member secured to said brake shoe, said stud engaging said member through which it passes to hold said shoe and drum in fixed lateral position, and resilient means whose longitudinal axis is spaced laterally from the longitudinal axis of said stud and is positioned between said member secured to said brake shoe and said bracket.

3. In an automotive vehicle the combination of a brake drum, a brake shoe, a first non-rotatable member associated with said drum, a second non-rotatable memebr secured to said first member by a plurality of bolts fixed axially with respect to one of said members and adjustable axially in slots formed in the other of said members and having its upper end extending in spaced relation overlying said drum and brake shoe, a member secured to said shoe on each side of and bridging said overlying portion of said second member, resilient means between said bridging member and said overlying portion, and stop means spaced from said resilient means along said overlying portion fixing said bridging member and said anchor bracket against relative motion laterally and rotatively one with respect to the other.

4. In an automotive vehicle the combination of a brake drum, a brake shoe, a non-rotatable member associated with said drum, a brake anchor bracket secured to said non-rotatable member and adjustable radially thereof, said bracket extending over said shoe in spaced relation to said drum, a member secured to said brake shoe on each side of and passing over said anchor bracket so as to bridge over the same, a helical spring seated in a bore in said anchor bracket and in yieldable engagement with said bridging member, and a stop secured to and projecting outwardly from said anchor bracket and extending freely through said bridging member serving thereby to hold said shoe laterally with respect to said drum without limiting its inward and outward radial movement, said radial movement being resiliently restricted inwardly by said spring and fixedly limited outwardly by said adjustable anchor bracket.

In testimony whereof I have signed my name to this specification.

GUSTAV W. CARLSON.